United States Patent [19]

Kornylak

[11] 4,379,503

[45] Apr. 12, 1983

[54] GRAVITY ROLLERWAY CONVEYOR

[75] Inventor: Andrew T. Kornylak, Hamilton, Ohio

[73] Assignee: Kornylak Corporation, Hamilton, Ohio

[21] Appl. No.: 940,078

[22] Filed: Sep. 6, 1978

Related U.S. Application Data

[63] Continuation of Ser. No. 782,936, Mar. 30, 1977, abandoned.

[51] Int. Cl.³ .............................................. B65G 13/00
[52] U.S. Cl. .................................. 193/37; 29/148.4 D; 29/446
[58] Field of Search ................... 193/37; 152/176, 188, 152/323, 404, 405; 301/63 PW; 29/110, 116 R, 132, 148.4 D, 159 R, 159.1, 235, 446

[56] References Cited

U.S. PATENT DOCUMENTS

| | | | |
|---|---|---|---|
| 884,702 | 4/1908 | Bowden | 152/404 X |
| 2,001,242 | 5/1935 | Dodge | 152/405 X |
| 2,145,525 | 1/1939 | Pedro | 152/405 X |
| 3,443,674 | 5/1969 | Kornylak | 193/37 |
| 3,651,911 | 3/1972 | Kornylak | 193/37 X |
| 3,655,021 | 4/1972 | Froio | 193/37 X |
| 3,877,504 | 4/1975 | Grawey et al. | 152/405 |

*Primary Examiner*—James L. Rowland
*Attorney, Agent, or Firm*—Thomas E. Beall, Jr.

[57] ABSTRACT

One or more of the rollers of a gravity rollerway conveyor has an annular outer tire forming the load support surface, which tire is assembled on the hub of the roller by first being turned inside out from its normal relaxed position and then being stretched over the hub that has a larger outer diameter than the tire inner diameter, so that the tire is pretensioned at its outer surface and precompressed at its inner surface to result in a significant decrease in the rolling resistance at substantially zero speed over a wide range of load values. The assembled tire has a central inner flange clamped in complementary recesses in the hub halves to prevent tire rotation.

5 Claims, 4 Drawing Figures

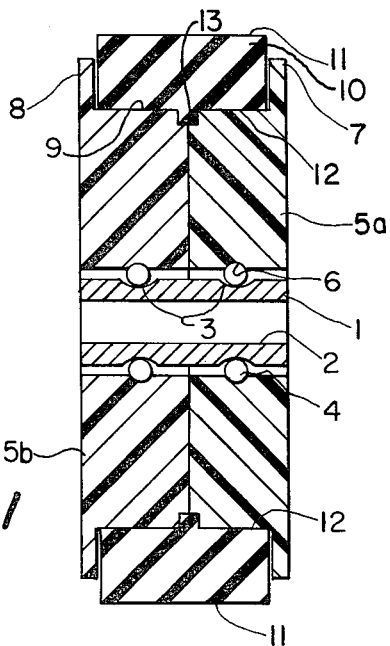
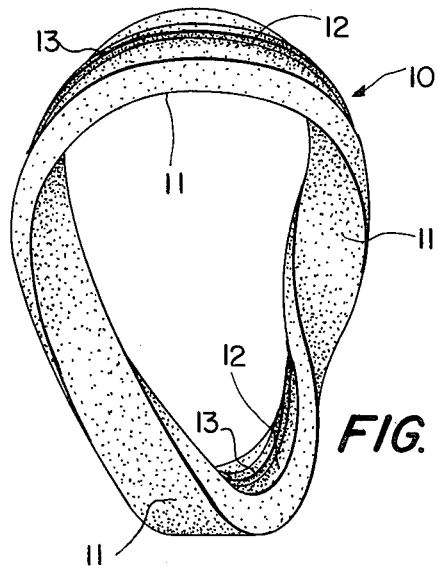
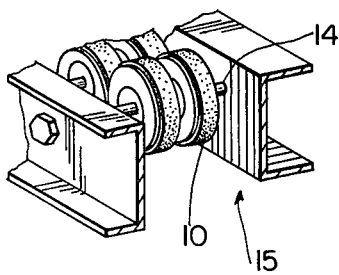
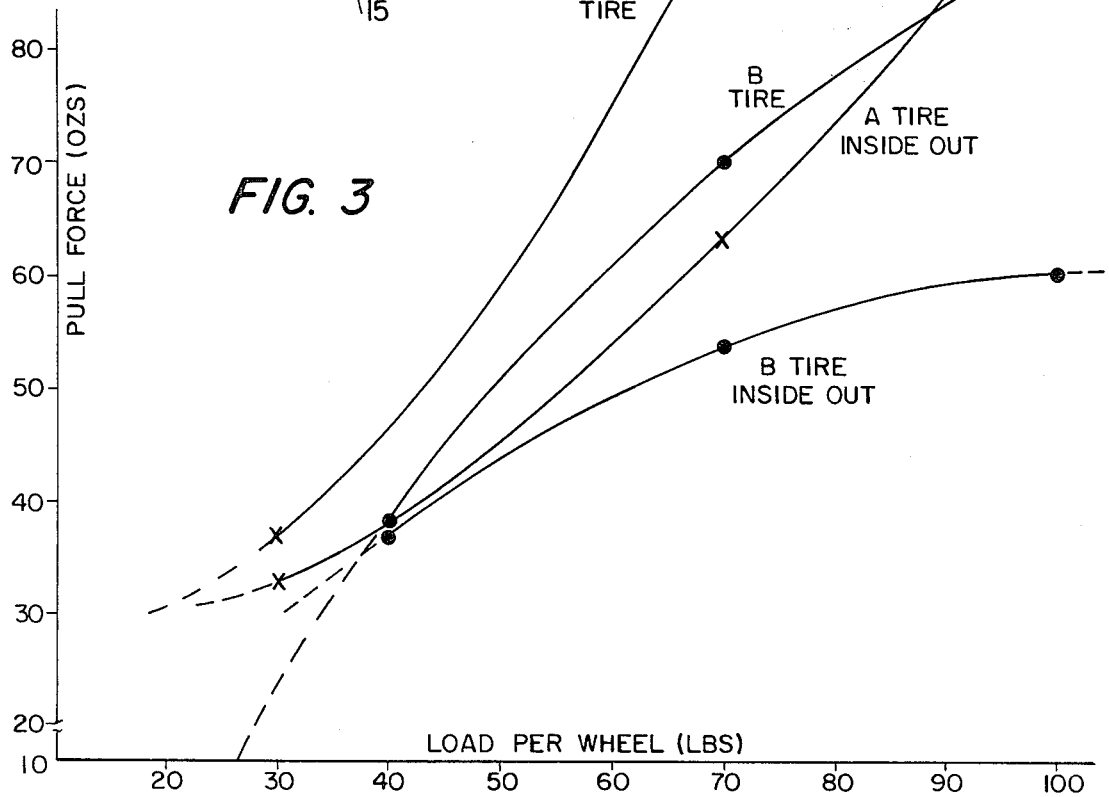
FIG. 1
FIG. 2
FIG. 4
FIG. 3

GRAVITY ROLLERWAY CONVEYOR

This is a continuation of application Ser. No. 782,936, filed Mar. 30, 1977 now abandoned.

BACKGROUND OF THE INVENTION

The present invention relates to conveyors of the type wherein a load, either as a separate article or contained on a pallet, is moved by gravity down a rollerway conveyor, which comprises a plurality of rollers having parallel, coplanar and horizontal axes. Specifically, the present invention relates to an improvement in the roller construction for such a rollerway gravity conveyor.

A rollerway gravity conveyor of the type that may employ the improved roller of the present invention is shown in the patent to Andrew T. Kornylak issued May 13, 1969 as U.S. Pat. No. 3,443,674. This conveyor has a plurality of rollers with annular elastomeric tires mounted on a hub that in turn is mounted by a roller bearing on an axle. The anti-friction bearing is used to reduce the rolling resistance of the roller and to try and keep the rolling resistance uniform over a range of different loads. The compressible tire is desirable to permit defects or other height variations in the pallet bottom surface or the article itself to ride "through" the tire instead of having to climb over it. This results in a reduced slope requirement for gravity rollerways and a smoother pallet or article movement for all types of roller conveyors.

Conveyor rollers with an annular resilient or elastomeric tire may be constructed so as to have a substantial amount of hysteresis, which is the ability of the tire to absorb energy from the load to control the speed of the movement of a load down a gravity conveyor, particularly, to absorb more energy with higher speed to either slow down a fast moving load or prevent a load from building up speed as it moves down a gravity rollerway conveyor. An example of such high hysteresis is found in the U.S. patent to Andrew T. Kornylak issued Nov. 23, 1971 as U.S. Pat. No. 3,621,960. Some resilient or elastomeric materials usable as annular tires on such rollers have no appreciable hysteresis.

Rolling resistance of such a conveyor wheel is defined as the pull required to move a load supported by such a roller, as measured at substantially zero speed to eliminate the effect of hysteresis. Thus, hysteresis will not affect the rolling resistance value of tire materials, which rolling resistance value varies greatly for different elastomeric materials used for roller tires. It is theorized, but not known, that the rolling resistance is caused by internal molecular friction. Although it cannot be adequately explained, it is easily measured on an experimental basis. While hysteresis is a desirable property for speed control, rolling resistance is most always an undesirable property, but a necessary evil of having a resilient tire. Rolling resistance will increase, in general, for an increase in wheel load, which is undesirable for a gravity conveyor.

If the inclination of a particular gravity conveyor is set up so that a load under restraint will reliably start moving when the restraint is removed (that is the inclination is sufficiently great) while at the same time the load will not gain excess speed over the length of its movement (that is, the inclination is sufficiently small), with a satisfactory compromise for these conflicting characteristics, the conveyor may be totally unsuited for a load of substantially different weight per wheel.

SUMMARY OF THE INVENTION

It is an object of the present invention to provide an elastomeric tired roller for conveyors, and particularly for gravity rollerway conveyors, for the reasons mentioned above with respect to the prior art while at the same time avoiding some of the difficulties heretofore found in the prior art with respect to rolling resistance.

Specifically, a roller is provided with an elastomeric tire that is turned inside out from its relaxed position and thereafter mounted on the hub of the roller so as to have a peripheral tension that decreases from the outer periphery towards the inner periphery, and particularly that decreases from the outer periphery to a neutral axis and thereafter increases in compression from the neutral axis to the inner periphery uniformly so as to be pretensioned at the outer diameter and precompressed at the inner diameter. Although difficult to explain, it has been found that such a tire exhibits more favorable rolling resistance characteristics when assembled inside out than when assembled in a manner according to the prior art, with all other factors being identical. Specifically, there is less of an increase in rolling resistance per unit increase in load per wheel with a tire constructed according to the present invention than with a tire constructed according to the prior art. Therefor for a particular design range for loads, a gravity rollerway conveyor constructed with rollers according to the present invention may have satisfactory start up over the entire load range at a substantially less inclination than a corresponding conveyor constructed according to the prior art, which in turn will make build up of speed of an article moving down the conveyor less of a problem with a conveyor constructed according to the present invention.

BRIEF DESCRIPTION OF THE DRAWING

Further objects, features and advantages of the present invention will become more clear from the following detailed description of a preferred embodiment as shown in the attached drawing, wherein:

FIG. 1 is a cross-sectional view taken through the axis of rotation of a roller constructed according to the present invention;

FIG. 2 is a perspective view of the annular tire of FIG. 1 shown removed from the roller hub and in the process of being turned inside out;

FIG. 3 is a graph of experimental data comparing the rolling resistance and load per wheel of two different rollers constructed according to the prior art and in turn modified according to the present invention; and FIG. 4 is a perspective view of a conveyor employing the roller of the present invention.

DETAILED DESCRIPTION OF A PREFERRED EMBODIMENT

The present invention relates to gravity rollerway conveyors, which are well known. By way of definition of what is meant by a gravity rollerway conveyor, such is considered to comprise preferably two rigidly supported parallel rails downwardly inclined in the conveying direction, with each such rail 15 supporting a plurality of load supporting undriven rollers having parallel, horizontal and coplanar axes that extend generally perpendicular to the conveying direction. For example, such a rollerway gravity conveyor is shown in the U.S. patent to Andrew T. Kornylak issued Mar. 18, 1975 as U.S. Pat. No. 3,871,501.

Since the actual details of a gravity rollerway conveyor, apart from the details of the individual rollers, form no part of the present invention by themselves, they have not been included in the drawing although it is to be understood that as a preferred embodiment the rollers constructed according to the present invention could constitute all of the rollers supporting the load L in FIG. 1 of U.S. Pat. No. 3,871,501. Since the features of the present invention are most advantageous with respect to decreasing the rolling resistance of an elastomeric tire for a gravity rollerway, with particular advantages for ease of start up of a stored load, it is at least desirable to have such rollers in a position so as to engage stored articles or pallets even though the entire rollerway could include other types of rollers. According to the broader aspects of the present invention, such rollers could be used as wheels for load supporting conveyor carts as shown in FIG. 2 of the above mentioned U.S. Pat. No. 3,871,501.

FIG. 1 is a cross-sectional view in a plane passing through the axis of rotation of the load supporting roller of a gravity rollerway conveyor, which view would be substantially the same for any plane passing through the axis of rotation. The axle 1, which may be made of steel or other rigid material, has an inner diameter for secure mounting on a support shaft 14 such as support shaft 56 of U.S. Pat. No. 3,871,501 or support shaft 36 of U.S. Pat. No. 3,443,674. The connection between the axle and the shaft may be a force fit or a loose fit with a standard bolt as the shaft. The outer periphery of the axle 1 is provided with inner races 3 that confine and rotatably support a plurality of bearing rollers 4 that are correspondingly confined by and rollingly engage outer races 6 that are formed on the inner periphery of the annular hub 5. The races 3 and 6 are annular and formed in pairs as a conventional anti-friction radial bearing. Although a friction sleeve bearing may be provided, an anti-friction roller bearing is preferred.

As an outward extension of the hub 5, there are provided two annular flanges 7, 8 between the outer peripheral support surface 9, for axially confining the annular elastomeric tire 10 that has an inner peripheral surface 12 engaging the support surface 9. The radial dimension for the flanges or rims 7, 8 is substantially less than the radial dimension or thickness of the tire 10, for the reasons as set forth in the U.S. patent to Andrew T. Kornylak U.S. Pat. No. 4,006,810 issued Feb. 8, 1977 with respect to limiting compression of the tire 10 under load.

The elastomeric tire 10 may be constructed of natural rubber, synthetic rubber, silicone rubber, urethane, or the like. The tire 10 may be bonded, with an adhesive, to the support surface 9 of the hub 5, or be unbonded. If the tire is unbonded, it is preferrable that the inner diameter of the tire surface 9 be less than the outer diameter 12 of the hub 5 prior to assembly. The tire 10 may include an inner, central flange 13 that is clamped between hub halves 5a and 5b; for this purpose the hub halves are provided with rabbets of less axial dimension than one-half the axial width of the flange 13 to lock the tire 10 against rotation without the use of an adhesive.

The construction of the axle, roller bearing, hub and tire insofar as it appears in FIG. 1 may be generally of any type including the construction shown in any of the above mentioned patents, together with the flange 13 and rabbet connection and/or the features of FIGS. 2 and 3.

Conveyor rollers constructed according to the prior art, particularly as constructed as according to the above identified patents, employ an annular tire that prior to being assembled with the hub is in a relaxed condition without any prestressing, and is thereafter assembled on the hub with or without stretching as determined by the relative dimensions of the tire inner diameter and hub outer diameter. FIG. 3 shows experimentally obtained curves for such a prior art type of conveyor roller comparing the rolling resistance (pull force) with the load per wheel for a tire A having a specific elastomeric material and a tire B having a different elastomeric material. It is seen that the pull force or rolling resistance increases with an increase in load per wheel for each of the tires A and B. According to the present invention, the relaxed tire is turned inside out as shown in FIG. 2 prior to being assembled on the hub 5. Specifically, the unassembled annular tire 10 in its relaxed state has an inner diameter 11 and an outer diameter 12. Prior to assembly, the tire is turned inside out, with FIG. 2 showing the partially completed process of turning the tire inside out, so that in the inside out condition, the surface 11 now becomes the outer surface and surface 12 now becomes the inner surface. It is in this inside out condition that the tire is assembled on the hub 5 according to the present invention. In the inside out condition, the portion of the elastomeric tire adjacent the inner periphery 12 is compressed and the material adjacent the outer periphery 11 is under tension, and such pretension and precompression decreases towards an intermediate neutral axis. The position of the neutral axis will radially vary according to the initial diameter of the the unstressed annular tire prior to being turned inside out and prior to being mounted on the hub in relationship to the outer diameter 9 of the hub 5. The inner diameter of the unstressed tire prior to being turned inside out and prior to being assembled on the hub 5 may be the same, greater, or less than the outer diameter 9 of the hub 5.

In FIG. 3, there is shown the graph for the rolling resistance characteristics versus the load per wheel of the same tire A and the same tire B as mentioned above, but mounted inside out according to the present invention, on identical hubs having identical axles and anti-friction bearings. It is seen that the tire A exhibits less rolling resistance for any load within the experimental range in its inside out condition than in its conventional condition, and the same is true of the tire B. For example, tire B with a load of 100 pounds per wheel conventionally assembled has a rolling resistance of 90 ounces and when turned inside out has a rolling resistance of only 60 ounces, which is a significant difference. At the same time, the tire B has an identical rolling resistance at 40 pounds load per wheel in both its conventional assembled condition and in its inside out condition according to the present invention. In general, it can been seen that the curves are considerably flattened to provide a smaller range of rolling resistance with the present invention over the design range of load per wheel.

While a preferred embodiment of the present invention has been illustrated in detail, with considerable modifications and variations, for purposes of illustration and the advantages of the details, further modifications, variations, and embodiments are contemplated according to the broader aspects of the present invention, all as determined by the spirit and scope of the following claims.

What is claimed:

1. A gravity rollerway conveyor, comprising: a support; a plurality of substantially identical rollers mounted on said support with generally horizontal axes of rotation lying in a common plane inclined downwardly with respect to the conveying direction that is perpendicular to the roller axes; each of said rollers having an outer annular tire at least partly extending radially outwardly beyond the remainder of the roller to provide the load engaging surface for the conveyor, with each of said annular tires having an outer peripheral surface and an inner peripheral surface; each of said rollers having a generally rigid hub supportingly engaging said annular tire inner peripheral surface; each of said annular tires being of an elastomeric material having a relaxed tension that is uniform throughout its cross-section when removed from said hub and turned inside out; when said tire is removed from said hub in a relaxed state inside out with respect to its positioning on said hub, the inner diameter of said tire being substantially smaller than the outer diameter of said hub; each of said tires having a maximum peripheral tension at its outer peripheral surface uniformly changing along a radius to a maximum compression at its inner peripheral surface to constitute means whereby each roller exhibits a rolling resistance at substantially zero speed that is substantially less than the rolling resistance it would exhibit if said annular tire was turned inside out from its mounted position and replaced on said hub.

2. The conveyor of claim 1, wherein said hub is constructed of at least two parts having mating recesses together forming an annular outwardly opening channel, and said annular tire has an inwardly extending annular flange on its inner peripheral surface axially compressed in said channel to fix said tire on said hub.

3. A roller, comprising: a substantially rigid hub having bearing means for rotating the roller about an axis; an outer annular tire at least partially extending radially outwardly from the remainder of the roller to provide a load engaging surface, with the annular tire having an outer peripheral surface and an inner peripheral surface; said hub supportingly engaging said annular tire inner peripheral surface; said annular tie, when supported on its hub, being of an elastomeric material having a relaxed tension that is uniform throughout its cross-section when removed from said hub and turned inside out; when said tire is removed from said hub in a relaxed state inside out with respect to its positioning on said hub, the inner diameter of said tire being substantially smaller than the outer diameter of said hub; each of said tires having a maximum peripheral tension at its outer peripheral surface uniformly changing along a radius to a maximum compression at its inner peripheral surface to constitute means to provide a rolling resistance at substantially zero speed that is substantially less than the rolling resistance it would exhibit if the annular tire was turned inside out from its mounted position and replaced on said hub.

4. The roller of claim 3, wherein said hub is constructed of at least two parts having mating recesses together forming an annular outwardly opening channel, and said annular tire has an inwardly extending annular flange on its inner peripheral surface axially compressed in said channel to fix said tire on said hub.

5. A method of constructing a gravity rollerway conveyor having a support rotatably mounting a plurality of rollers with generally horizontal axes of rotation lying in a common plane inclined downwardly with respect to the conveying direction that is perpendicular to the roller axis, comprising the steps of: taking an annular tire in a relaxed state having substantially no tension throughout it and turning it inside out, so that its former inside peripheral surface becomes its outside peripheral surface; mounting the annular tires that had been turned inside out according to the preceding step respectively on a plurality of the rollers of the gravity rollerway conveyor so that the elastomeric tires will be stretched during mounting on the rollers and thereby pretensioned in their outer peripheral surface as mounted on the rollers to engage a load carried by the conveyor with a rolling resistance at substantially zero speed that is substantially less than the rolling resistance that would be exhibited if the annular tire had not been turned inside out prior to mounting on the roller; and selecting the annular tires and the rollers so that the elastomeric material of the tires further exhibits maximum peripheral compression in the inner peripheral surface gradually changing along a radius to maximum peripheral tension in the outer peripheral surface when the tire is mounted on the roller.

* * * * *